B. Kemp,
Hominy Mill.
No. 60,385.   Patented Dec. 11, 1866.
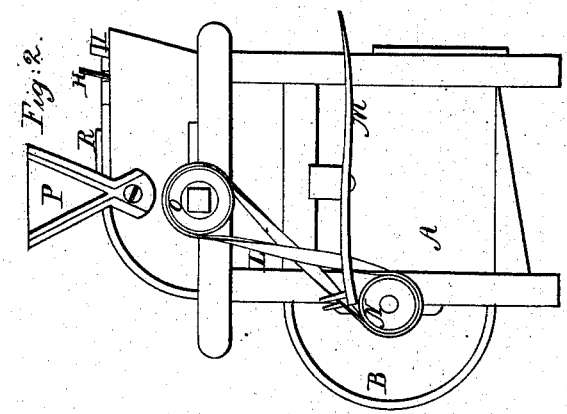
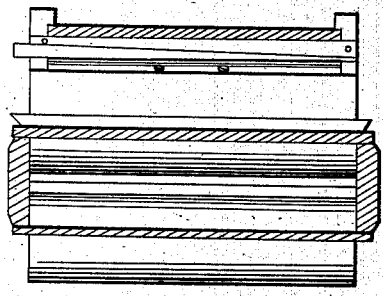
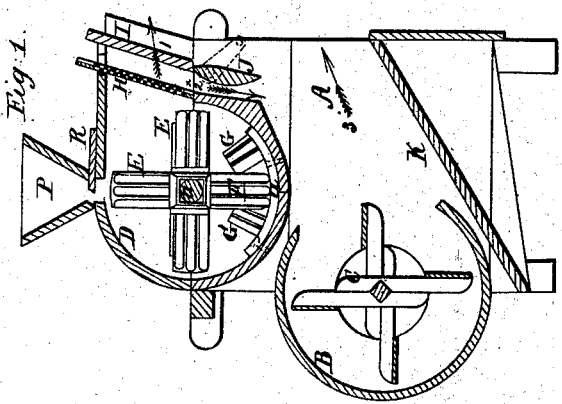
Witnesses;
A. A. Yeatman
Charles Alexander
Inventor;
Bernard Kemp
pre
Alexander & Mason
Attorneys

United States Patent Office.

IMPROVEMENT IN HOMINY MILLS.

BERNARD KEMP, OF KNOXVILLE, MARYLAND.

Letters Patent No. 60,385, dated December 11, 1866.

*The Schedule referred to in these Letters Patent and making part of the same.*

TO ALL WHOM IT MAY CONCERN:

Be it known that I, BERNARD KEMP, of Knoxville, Frederick county, and State of Maryland, have invented certain new and useful improvements in Hominy Mills; and I do hereby declare that the following is a full, clear, and exact description of the same, reference being had to the accompanying drawings, and to the letters of reference marked thereon, in the annexed drawing, making part of this specification.

A represents the frame of the machine, which is made somewhat similar to that of an ordinary grain separating machine. B represents a drum in said frame, which is provided with a fan, C, which said fan may be constructed in any of the known and usual ways, the draught or current from the fan being in the direction of arrow 3. Above the drum, B, and within the frame, A, is a cylindrical case, D, which has passing through it from one end to the other, and a little beyond its ends, a shaft, $a$, secured upon this shaft, $a$, are a series of collars, provided with arms, E E, which revolve upon the said shaft, in the case, D. These collars and arms are made of any suitable metal and the arms are corrugated or fluted on their sides, as seen in fig. 1. Upon the bottom of the case, D, are secured a series of curved metallic bars, which are provided with the teeth, G G, which are also fluted or corrugated upon their sides. The arms, E E, play between the teeth G G, and the bars $d$. P represents a corn-hopper, which is placed above the case D, and which opens into it. R is a slide, by means of which the grain can be shut-off so as not to pass from the hopper into the case. H represents one or more screens, placed so as to close an opening in one side of the case D. I represents a sliding door, which is also intended to close this same opening when it is desired. Beneath the door I, is a guide-board, J, which is pivoted in the frame A, near its upper edge, and which is regulated by means of a crank on the outside of the frame. O and N represent pulleys upon the ends of the fan-shaft and the shaft, $a$, which said pulleys are connected by means of a band, L. M is a lever for shifting the band on the pulleys from a loose to a fixed one. The opposite end of shaft, A, is provided with a pulley, by means of which power is applied to the machine. In using this machine, the corn is placed in the hopper, P, and by means of the slide, R, admitted into the case, D. The shaft $a$, being set in motion, its arms acting with the teeth, G G, break the grains of corn and scale the husk from it. During this operation, the door I is removed and the husks are to some extent driven through the seives or screens, H. After the corn has been sufficiently broken and the husk removed, the screens are taken out, and the door, I, is placed in position, as shown in fig. 1. The board J is then turned, as seen in fig. 1, and the corn is driven by the arms, E E, out of the case, D, against board, I, and falls down in the direction of arrow 2. In falling upon the inclined bottom, K, it passes through the draught of air from the fan, C, and in passing, the light particles and husks which remain are driven out of the hominy in the direction of arrow 3. The hominy, falling upon the bottom, K, passes out at the bottom of the machine. After this operation, the screens are again returned to position, the door, I, removed, the case, D, again supplied with corn, and another batch of hominy prepared, which in turn is driven from the case D, and subjected to the fan blast. When the door, I, is removed and the husks are thrown out through the seives, the lower end of the board, J, is thrown out, the upper end resting against the side of the case, D, for the purpose of conducting the husks and wastage of the corn away from the machine.

Having thus fully described my invention, what I claim as new, and desire to secure by Letters Patent, is—

The arrangement of the frame A, with its case D, screens H, door I, board J, fan C, arms E E, and teeth G, in the manner substantially as and for the purposes herein specified.

As evidence that I claim the foregoing, I have hereunto set my hand in the presence of two witnesses.

BERNARD KEMP.

Witnesses:
JAMES REELY,
J. M. MILLER.